United States Patent
Kim et al.

(10) Patent No.: US 10,740,588 B2
(45) Date of Patent: Aug. 11, 2020

(54) FINGERPRINT SENSOR AND METHOD OF MANUFACTURING THE SAME

(71) Applicant: SAMSUNG ELECTRONICS CO., LTD., Suwon-si (KR)

(72) Inventors: Jinmyoung Kim, Hwaseong-si (KR); Seogwoo Hong, Yongin-si (KR); Seokwhan Chung, Hwaseong-si (KR); Byungkyu Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 384 days.

(21) Appl. No.: 15/586,632

(22) Filed: May 4, 2017

(65) Prior Publication Data

US 2018/0137333 A1 May 17, 2018

(30) Foreign Application Priority Data

Nov. 14, 2016 (KR) .......................... 10-2016-0151423

(51) Int. Cl.
*G06K 9/00* (2006.01)
*G06F 3/044* (2006.01)

(52) U.S. Cl.
CPC ......... *G06K 9/00053* (2013.01); *G06F 3/044* (2013.01); *G06K 9/0002* (2013.01)

(58) Field of Classification Search
CPC ... G06K 9/00053; G06K 9/0002; G06F 3/044
See application file for complete search history.

(56) References Cited

U.S. PATENT DOCUMENTS

| | | | | |
|---|---|---|---|---|
| 7,439,962 | B2* | 10/2008 | Reynolds | G06F 3/03547 345/173 |
| 8,564,314 | B2* | 10/2013 | Shaikh | G06K 9/0002 324/658 |
| 9,158,421 | B2 | 10/2015 | Kurasawa et al. | |
| 9,158,958 | B2* | 10/2015 | Wickboldt | G06K 9/00026 |
| 9,542,589 | B2* | 1/2017 | Thammasouk | G06K 9/00026 |
| 9,639,733 | B2* | 5/2017 | Kremin | G06K 9/0002 |
| 10,037,452 | B2* | 7/2018 | Han | G06K 9/0002 |
| 10,049,254 | B2* | 8/2018 | Wickboldt | G06F 21/32 |
| 10,055,054 | B2* | 8/2018 | Lin | G06F 3/044 |
| 10,127,427 | B2* | 11/2018 | Lee | G06K 9/00053 |

(Continued)

FOREIGN PATENT DOCUMENTS

| | | |
|---|---|---|
| JP | 5981005 B2 | 8/2016 |
| WO | 2013/049267 A1 | 4/2013 |

(Continued)

OTHER PUBLICATIONS

Communication dated Apr. 5, 2018 issued by the European Patent Office in counterpart European Patent Application No. 17195959.6.

*Primary Examiner* — Manav Seth
(74) *Attorney, Agent, or Firm* — Sughrue Mion, PLLC

(57) ABSTRACT

A fingerprint sensor and a method of manufacturing the same are provided. The fingerprint sensor includes an active region including driving electrodes and sensing electrodes crossing the driving electrodes, tracer regions connected respectively to the driving electrodes and the sensing electrodes, and shield layers disposed respectively on the tracer regions.

13 Claims, 6 Drawing Sheets

(56) References Cited

U.S. PATENT DOCUMENTS

| | | | |
|---|---|---|---|
| 2005/0083307 A1* | 4/2005 | Aufderheide | G06F 3/044 |
| | | | 345/173 |
| 2011/0139516 A1* | 6/2011 | Nirmal | G06F 3/044 |
| | | | 178/18.01 |
| 2012/0326992 A1 | 12/2012 | Yeh | |
| 2013/0033450 A1 | 2/2013 | Coulson et al. | |
| 2013/0285973 A1 | 10/2013 | Elias et al. | |
| 2016/0005352 A1* | 1/2016 | Kim | G06F 3/044 |
| | | | 345/212 |
| 2017/0316249 A1* | 11/2017 | Lee | G06K 9/00053 |
| 2017/0364176 A1* | 12/2017 | Kim | G06F 3/0416 |

FOREIGN PATENT DOCUMENTS

| | | |
|---|---|---|
| WO | 2013/053215 A1 | 4/2013 |
| WO | WO2013049267 * | 4/2013 |
| WO | 2016/127117 A1 | 8/2016 |

\* cited by examiner

FINGERPRINT SENSOR AND METHOD OF MANUFACTURING THE SAME

CROSS-REFERENCE TO RELATED APPLICATION

This application claims priority from Korean Patent Application No. 10-2016-0151423, filed on Nov. 14, 2016, in the Korean Intellectual Property Office, the disclosure of which is incorporated herein by reference in its entirety.

BACKGROUND

1. Field

Apparatuses and methods consistent with example embodiments relate to fingerprint sensors, and more particularly, to fingerprint sensors for recognizing a fingerprint of a user and methods of manufacturing the fingerprint sensors.

2. Description of the Related Art

Personal authentication by using unique personal characteristics, such as fingerprints, voices, faces, hands, or irises has been gradually increased. The function of personal authentication has been used in banking equipment, entrance/exit control equipment, mobile equipment, or notebooks. Recently, because mobile devices, such as smart phones, are widely provided, fingerprint recognition for personal authentication is employed to protect information stored in the smart phones.

As the accuracy standard of a fingerprint authentication increases, a fingerprint sensor having a high resolution and high sensitivity is desired.

SUMMARY

Example embodiments may address at least the above problems and/or disadvantages and other disadvantages not described above. Also, the example embodiments are not required to overcome the disadvantages described above, and may not overcome any of the problems described above.

Example embodiments provide fingerprint sensors and method of manufacturing the fingerprint sensors.

According to an aspect of an example embodiment, there is provided a fingerprint sensor including an active region including driving electrodes and sensing electrodes crossing the driving electrodes, tracer regions connected respectively to the driving electrodes and the sensing electrodes, and shield layers disposed respectively on the tracer regions.

The tracer regions may include a first tracer region including wirings connected respectively to the sensing electrodes as an extension of the sensing electrodes, and a second tracer region including wirings connected respectively to the driving electrodes as an extension of the driving electrodes.

The shield layers may include a first shield layer disposed on the extension of the sensing electrodes in the first tracer region; and a second shield layer disposed on the extension of the driving electrodes in the second tracer region.

The shield layers may include a transparent conductive metal oxide.

The driving electrodes may include a metal material.

The sensing electrodes may include a transparent conductive metal oxide.

The sensing electrodes may be connected to a metal material layer through a via at an edge of the active region.

A shield layer connected to the sensing electrodes, among the shield layers, may include a transparent conductive metal oxide, and the sensing electrodes and the shield layer may be spaced apart.

Capacitances may be disposed at regions where the driving electrodes cross the sensing electrodes.

A width of each of the sensing electrodes at a respective one of the regions at which the capacitances are disposed may be less than a width of each of the sensing electrodes at a respective one of regions at which the capacitances are not disposed.

The shield layers may have a diamond shape or a rectangular shape.

The sensing electrodes and the shield layers may include a same transparent conductive metal oxide.

According to an aspect of another example embodiment, there is provided a method of manufacturing a fingerprint sensor, the method including forming a metal pattern layer on a substrate by patterning a metal material layer on the substrate, to form driving electrodes and a pad, and forming and patterning an insulating material layer on the substrate and the metal pattern layer. The method further includes forming a transparent conductive metal oxide pattern layer on the patterned insulating material layer by patterning a transparent conductive metal oxide layer that is formed on the patterned insulating material layer, to form sensing electrodes and shield layers, and forming a passivation layer on the transparent conductive metal oxide pattern layer by coating an insulating material on the transparent conductive metal oxide pattern layer.

The sensing electrodes may be formed in a direction crossing the driving electrodes.

The sensing electrodes may include a transparent conductive material.

The patterning of the insulating material layer may include etching a part of the insulating material layer to expose a part of the metal pattern layer.

The transparent conductive metal oxide layer may be formed through the etched part of the insulating material layer and on the exposed part of the metal pattern layer.

According to an aspect of another example embodiment, there is provided a fingerprint sensor including driving electrodes, sensing electrodes crossing the driving electrodes, first wiring extensions connected respectively to the sensing electrodes, second wiring extensions connected respectively to the driving electrodes, a first shield layer disposed on the first wiring extensions, and a second shield layer disposed on the second wiring extensions.

The first wiring extensions may be connected respectively to the sensing electrodes at a first side of the sensing electrodes, and the fingerprint sensor further may include third wiring extensions connected respectively to the sensing electrodes at a second side of the sensing electrodes, the second side being opposite to the first side, and a third shield layer disposed on the third wiring extensions.

The driving electrodes and the second wiring extensions may include a metal material, and the sensing electrodes, the first wiring extensions, the first shield layer, the second shield layer, and the third shield layer may include a transparent conductive metal oxide.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Example embodiments are described in greater detail below with reference to the accompanying drawings.

Terminologies used herein are selected as used by those of ordinary skill in the art in consideration of functions of the example embodiments, but may vary according to the technical intention, precedents, or a disclosure of a new technology. Also, some terms are arbitrarily selected by the applicant, and in this case, the meanings of the terms will be described in detail at corresponding parts of the specification. Accordingly, the terms used in the specification may be defined not by simply the names of the terms but based on the meaning and contents of the whole specification.

In the descriptions of the example embodiments, it will be understood that, when an element is referred to as being connected to another element, it may include electrically connected when the element is directly connected to the other element and when the element is indirectly connected to the other element by intervening a constituent element. Also, it may be understood that, when a part "comprises" or "includes" a constituent element in the specification, unless otherwise defined, it is not excluding other elements but may further include other elements. Also, in the specification, the term "units" or "modules" denote units or modules that process at least one function or operation, and may be realized by hardware, software, or a combination of hardware and software.

It will be further understood that the term "comprises" or "includes" may not be construed as necessarily including various constituent elements and various operations described in the specification, and also may not be construed that portions of the constituent elements or operations of the various constituent elements and various operations may not be included or additional constituent elements and operations may further be included.

The descriptions of the example embodiments may not be interpreted as limiting the scope of right, and example embodiments that are readily inferred from the detailed descriptions and example embodiments by those of ordinary skill in the art will be construed as being included in the disclosure.

Figure 1:
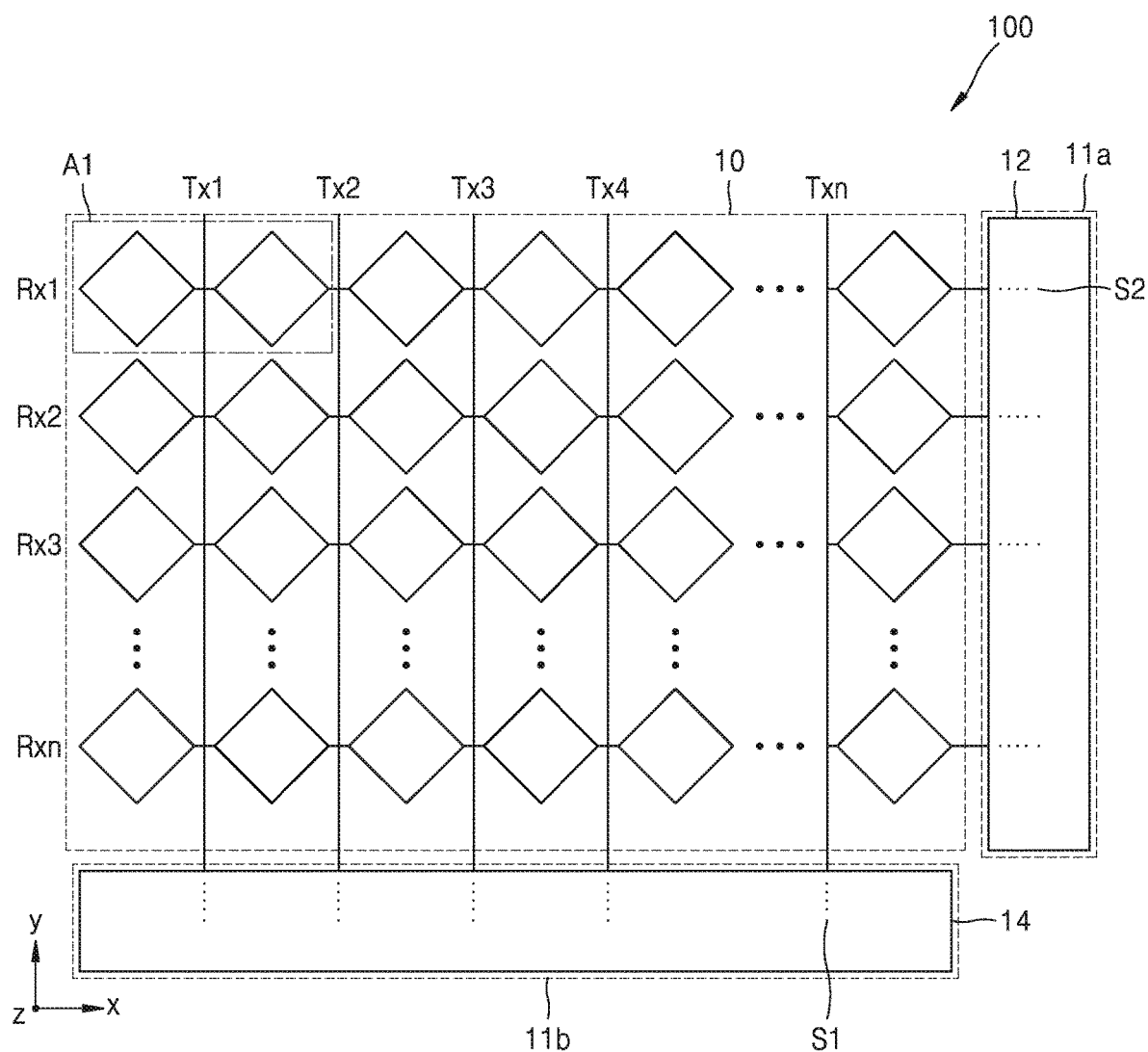
FIG. 1 is a plan view of a schematic configuration of a fingerprint sensor according to an example embodiment.

FIG. 1 is a plan view of a schematic configuration of a fingerprint sensor 100 according to an example embodiment.

Referring to FIG. 1, the fingerprint sensor 100 includes driving electrodes Tx: Tx1, Tx2, Tx3, Tx4 . . . Txn (here, n is an integer) and sensing electrodes Rx: Rx1, Rx2, Rx3 . . . Rxn. The driving electrodes Tx: Tx1, Tx2, Tx3, Tx4 . . . Txn and the sensing electrodes Rx: Rx1, Rx2, Rx3 . . . Rxn may cross each other. The driving electrodes Tx: Tx1, Tx2, Tx3, Tx4 . . . Txn may be formed in a first direction, for example, in a y direction, based on an upper surface of the fingerprint sensor 100, and the sensing electrodes Rx: Rx1, Rx2, Rx3 . . . Rxn may be formed in a second direction crossing the first direction, for example, in an x direction, based on the upper surface of the fingerprint sensor 100. The first direction and the second direction may be directions perpendicular to each other. However, the first direction and the second direction may not necessarily form 90 degrees.

The driving electrodes Tx: Tx1, Tx2, Tx3, Tx4 . . . Txn and the sensing electrodes Rx: Rx1, Rx2, Rx3 . . . Rxn respectively may be formed to include a plurality of individual electrode lines. A region where the driving electrodes Tx: Tx1, Tx2, Tx3, Tx4 . . . Txn and the sensing electrodes Rx: Rx1, Rx2, Rx3 . . . Rxn cross each other is an active region 10 or a touch pad region.

A region where the driving electrodes Tx: Tx1, Tx2, Tx3, Tx4 . . . Txn and the sensing electrodes Rx: Rx1, Rx2, Rx3 . . . Rxn cross each other is referred to as the active region 10. Wiring regions that connect the active region 10 to a readout IC are referred to as first and second tracer regions 11a and 11b.

The first and second tracer regions 11a and 11b respectively are regions extending from the sensing electrodes Rx: Rx1, Rx2, Rx3 . . . Rxn and the driving electrodes Tx: Tx1, Tx2, Tx3, Tx4 . . . Txn of the active region 10. First and second shield layers 12 and 14 respectively are formed on the extended sensing electrodes Rx: Rx1, Rx2, Rx3 . . . Rxn and the extended driving electrodes Tx: Tx1, Tx2, Tx3, Tx4 . . . Txn. In FIG. 1, reference numeral 12 indicates a first shield layer 12 formed on the extended sensing electrodes Rx: Rx1, Rx2, Rx3 . . . Rxn, and reference numeral 14 indicates a second shield layer 14 on the extended driving electrodes Tx: Tx1, Tx2, Tx3, Tx4 . . . Txn. Regions where the first and second shield layers 12 and 14 are formed respectively may be the first and second tracer regions 11a and 11b.

If the first and second shield layers 12 and 14 are not formed on the first and second tracer regions 11a and 11b, fingers of a user may directly contact the extensions of the driving electrodes Tx: Tx1, Tx2, Tx3, Tx4 . . . Txn and the sensing electrodes Rx: Rx1, Rx2, Rx3 . . . Rxn of the first and second tracer regions 11a and 11b, and thus, a sensed fingerprint image may be degraded. In the case of the fingerprint sensor 100 according to an example embodiment, the first and second shield layers 12 and 14 respectively are formed on the first and second tracer regions 11a and 11b, and thus, although the fingers of the user contact the first and second tracer regions 11a and 11b, an effect on the quality of the sensed fingerprint image may be reduced.

The driving electrodes Tx: Tx1, Tx2, Tx3, Tx4 . . . Txn of the fingerprint sensor 100 according to an example embodiment may include a conductive material, such as a metal or a metal alloy. For example, the driving electrodes Tx: Tx1, Tx2, Tx3, Tx4 . . . Txn may include Cu, Ag, Au, Pt, Al, W, Li, Ti, Ta, or Pd. The sensing electrodes Rx: Rx1, Rx2, Rx3 . . . Rxn may also include a conductive material, such as a transparent conductive metal oxide (TCMO). For example, the sensing electrodes Rx: Rx1, Rx2, Rx3 . . . Rxn may include indium-tin-oxide (ITO) or indium-zinc-oxide (IZO). However, the sensing electrodes Rx: Rx1, Rx2, Rx3 . . . Rxn may include a transparent conductive metal oxide in the active region 10, and in the wiring region besides the active region 10, may include a metal or a metal alloy.

In the first and second tracer regions 11a and 11b, the first and second shield layers 12 and 14 respectively formed on the sensing electrodes Rx: Rx1, Rx2, Rx3 . . . Rxn and the driving electrodes Tx: Tx1, Tx2, Tx3, Tx4 . . . Txn may include a transparent conductive metal oxide. The first and second shield layers 12 and 14 may include the same material used to form the sensing electrodes Rx: Rx1, Rx2, Rx3 . . . Rxn in the active region 10, for example, ITP or IZO. Although the first and second shield layers 12 and 14 are formed using the same material used to form the sensing electrodes Rx: Rx1, Rx2, Rx3 . . . Rxn in the active region 10, the first and second shield layers 12 and 14 may be electrically separated from the sensing electrodes Rx: Rx1, Rx2, Rx3 . . . Rxn.

The first and second shield layers 12 and 14 respectively formed on the extensions of the sensing electrodes Rx: Rx1, Rx2, Rx3 . . . Rxn and the driving electrodes Tx: Tx1, Tx2, Tx3, Tx4 . . . Txn may be connected by using a constant bias to reduce the affect of the fingers of the user to the quality of the sensed fingerprint image. Also, a constant bias may be supplied to the first and second shield layers 12 and 14 to make the fingerprint sensor 100 insensitive to an environmental change of the fingerprint sensor 100, and thus, the shield effect may be increased.

Figure 2:
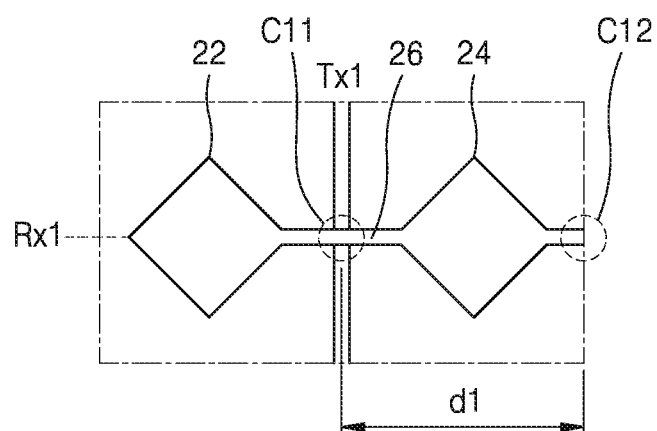
FIG. 2 is a magnified plan view of a region A1 of the fingerprint sensor of FIG. 1, according to an example embodiment.

FIG. 2 is a magnified plan view of a region A1 of the fingerprint sensor 100 of FIG. 1, according to an example embodiment.

Referring to FIGS. 1 and 2, in the active region 10 of the fingerprint sensor 100 according to an example embodiment, mutual capacitances C11 and C12 are formed on regions where the driving electrodes Tx: Tx1, Tx2, Tx3, Tx4 . . . Txn and the sensing electrodes Rx: Rx1, Rx2, Rx3 . . . Rxn cross each other. An insulating layer may be formed between a part where the driving electrode Tx1 and the sensing electrode Rx1 cross each other. The driving electrode Tx1 may be formed in a line shape with no width change. The sensing electrode Rx1 includes first pattern regions 22 and 24 having a diamond shape with a relatively large area, and a second pattern region 26 between the first pattern regions 22 and 24. The first pattern regions 22 and 24 of the sensing electrode Rx1 may have a width greater than that of the second pattern region 26. The driving electrode Tx1 may be formed by crossing the sensing electrode Rx1 in the second pattern region 26 of the sensing electrode Rx1.

Figure 3:
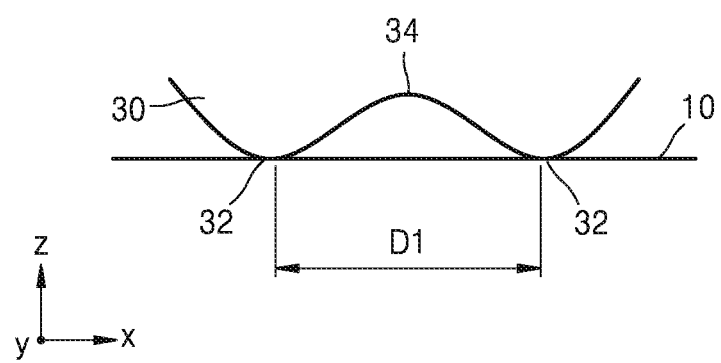
FIG. 3 is a cross-sectional view contacting a fingerprint of a user on a surface of the fingerprint sensor of FIG. 1, according to an example embodiment.

FIG. 3 is a cross-sectional view showing a contact of a fingerprint of a user on a surface of the fingerprint sensor 100 of FIG. 1, according to an example embodiment.

Referring to FIGS. 1 through 3, a fingerprint region 30 of a user includes ridge regions 32, which are skin regions that relatively protrude more than other surrounding skin regions, and a valley region 34 between the ridge regions 32. When the ridge regions 32 of the fingerprint region 30 contact the active region 10 of the fingerprint sensor 100, the valley region 34 may not directly contact the active region 10 of the fingerprint sensor 100, and the valley region 34 may be spaced apart from the fingerprint sensor 100. In the fingerprint sensor 100 according to the current example embodiment, a driving signal 51 is applied from a driver to the driving electrodes Tx: Tx1, Tx2, Tx3, Tx4 . . . Txn formed in the first direction. Also, the sensing electrodes Rx: Rx1, Rx2, Rx3 . . . Rxn transmits an electrical signal S2 having information about the fingerprint region 30 of the user to a signal measurer.

In the active region 10 of the fingerprint sensor 100 according to the current example embodiment, a gap dl between the regions where the driving electrodes Tx: Tx1, Tx2, Tx3, Tx4 . . . Txn and the sensing electrodes Rx: Rx1, Rx2, Rx3 . . . Rxn cross each other, that is, a gap dl between the mutual capacitances C11 and C12, may be less than a gap D1 between the ridge regions 32, which are protruding regions of the fingerprint region 30. For example, the gap dl may have a size in a range from $\frac{1}{10}$ to $\frac{1}{4}$ of the gap D1.

Figure 4A:
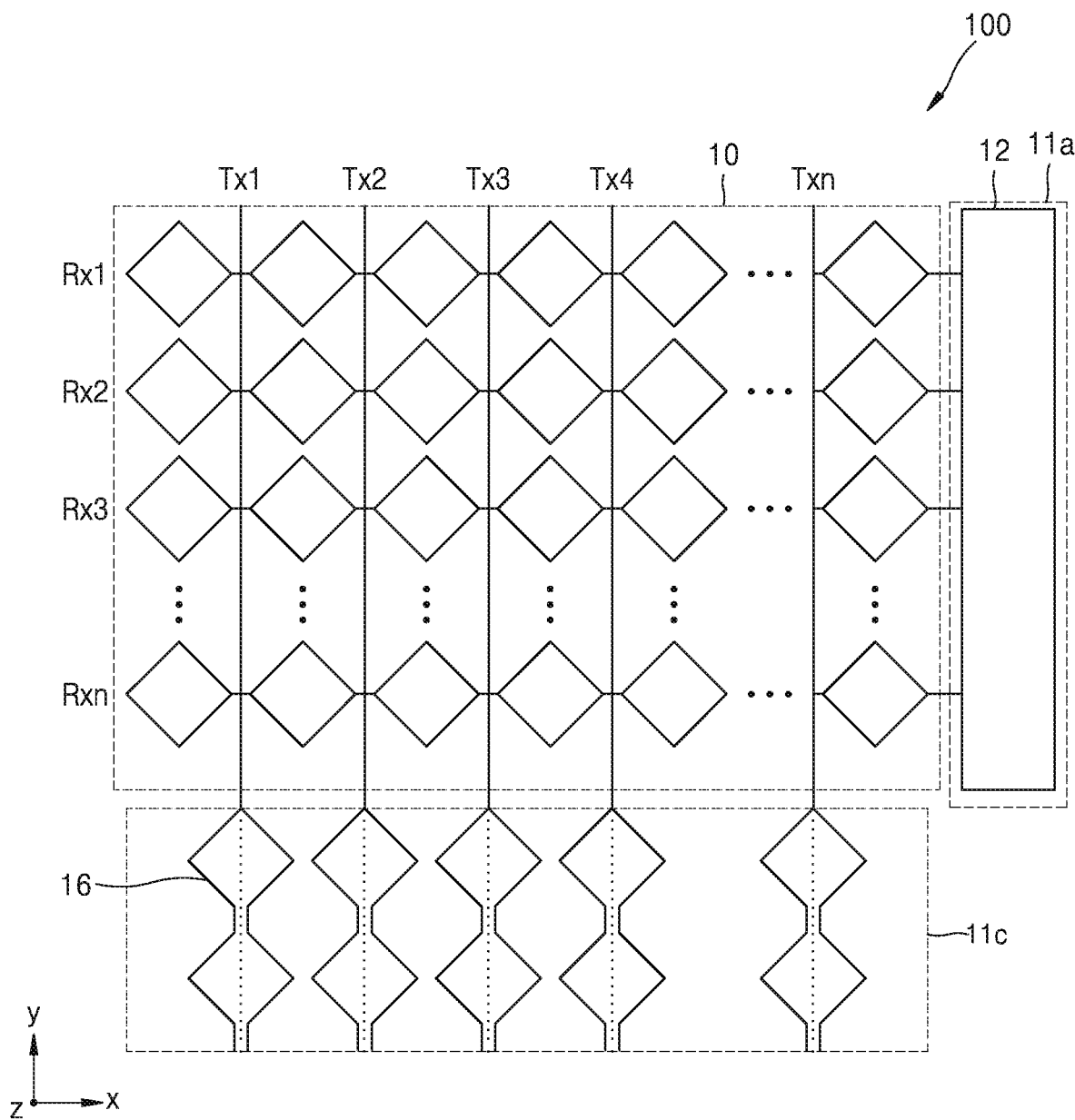
FIGS. 4A and 4B are plan views of schematic configurations of fingerprint sensors according to example embodiments.
Figure 4B:
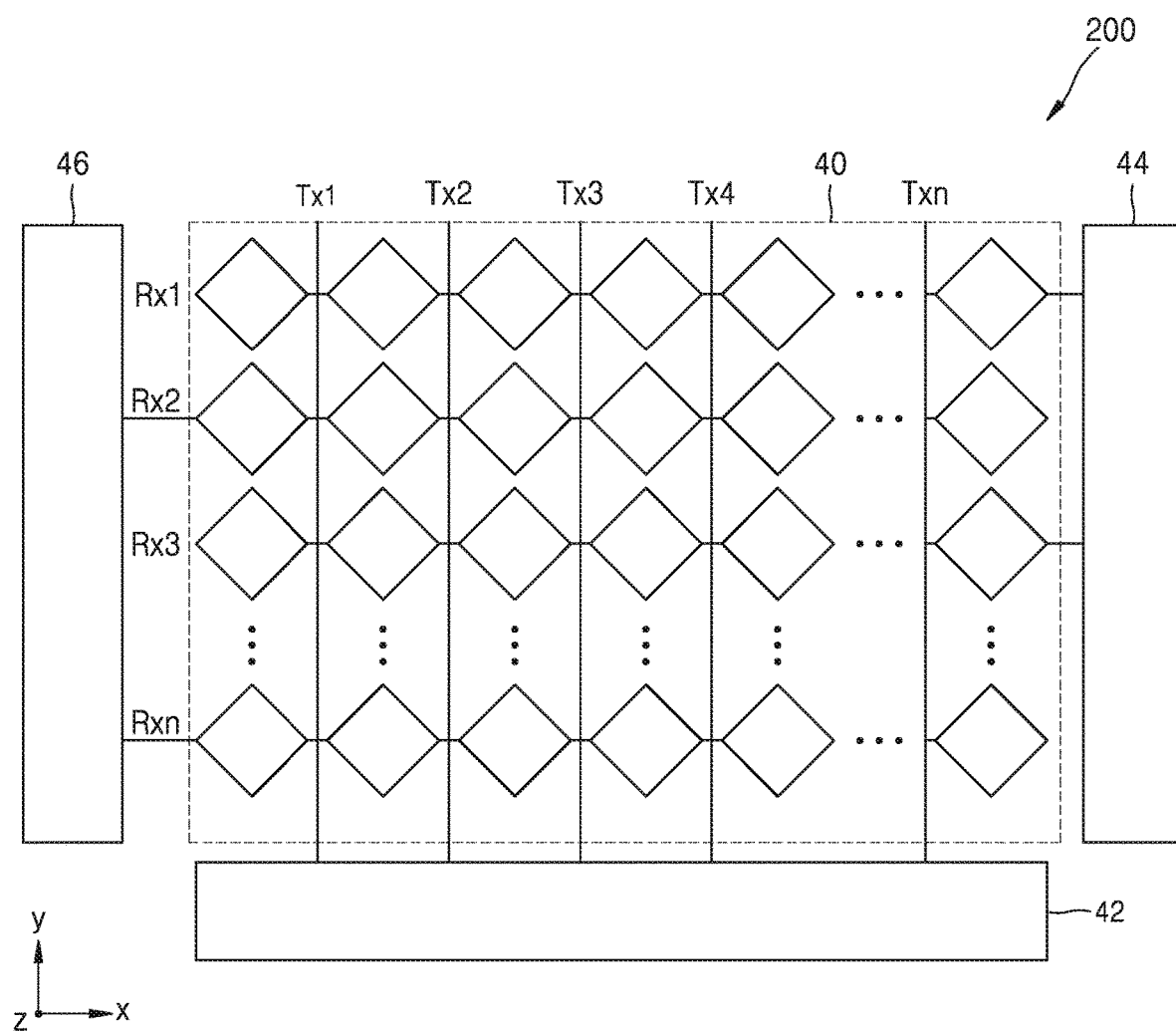

FIGS. 4A and 4B are plan views of schematic configurations of fingerprint sensors 100a and 200 according to example embodiments.

Referring to FIG. 4A, the fingerprint sensor 100a includes driving electrodes Tx: Tx1, Tx2, Tx3, Tx4 . . . Txn and sensing electrodes Rx: Rx1, Rx2, Rx3 . . . Rxn, and the driving electrodes Tx: Tx1, Tx2, Tx3, Tx4 . . . Txn and the sensing electrodes Rx: Rx1, Rx2, Rx3 . . . Rxn may cross each other. The driving electrodes Tx: Tx1, Tx2, Tx3, Tx4 . . . Txn and the sensing electrodes Rx: Rx1, Rx2, Rx3 . . . Rxn may be formed in a direction perpendicular to each other, and respectively may include a plurality of individual electrode lines. The region where the driving electrodes Tx: Tx1, Tx2, Tx3, Tx4 . . . Txn and the sensing electrodes Rx: Rx1, Rx2, Rx3 . . . Rxn cross each other is an active region 10 or a touch pad region.

First and third tracer regions 11a and 11c as wiring regions are formed to connect the active region 10 to a readout IC. The first and third tracer regions 11a and 11c may be regions extending from the driving electrodes Tx: Tx1, Tx2, Tx3, Tx4 . . . Txn and the sensing electrodes Rx: Rx1, Rx2, Rx3 . . . Rxn of the active region 10. First and third shield layers 12 and 16 respectively are formed on the extending sensing electrodes Rx: Rx1, Rx2, Rx3 . . . Rxn and the driving electrodes Tx: Tx1, Tx2, Tx3, Tx4 . . . Txn. The first and third shield layers 12 and 16 may be formed in various shapes to cover all of the sensing electrodes Rx: Rx1, Rx2, Rx3 . . . Rxn. For example, the first shield layer 12 formed on a first tracer region 11a, which is an extension of the sensing electrodes Rx: Rx1, Rx2, Rx3 . . . Rxn, may be formed in a rectangular shape or a plate shape extending in a y direction. Also, the third tracer region 11c formed on the third tracer region 11c, which is an extension of the driving electrodes Tx: Tx1, Tx2, Tx3, Tx4 . . . Txn, may be formed in a polygonal shape, such as a diamond shape, based on an upper surface, that is, an x-y plane of the fingerprint sensor 100a.

The third shield layer 16 may also be formed in a polygonal shape, such as a diamond shape similar to the shape of the sensing electrodes Rx: Rx1, Rx2, Rx3 . . . Rxn in the active region 10, and thus, the variation of visibility may be reduced.

Referring to FIG. 4B, the fingerprint sensor 200 includes driving electrodes Tx: Tx1, Tx2, Tx3, Tx4 . . . Txn and sensing electrodes Rx: Rx1, Rx2, Rx3 . . . Rxn. The driving electrodes Tx: Tx1, Tx2, Tx3, Tx4 . . . Txn and the sensing electrodes Rx: Rx1, Rx2, Rx3 . . . Rxn may be formed to cross each other. The driving electrodes Tx: Tx1, Tx2, Tx3, Tx4 . . . Txn and the sensing electrodes Rx: Rx1, Rx2, Rx3 . . . Rxn respectively may include a plurality of individual electrode lines. A region where the driving electrodes Tx: Tx1, Tx2, Tx3, Tx4 . . . Txn and the sensing electrodes Rx: Rx1, Rx2, Rx3 . . . Rxn cross each other is an active region 40 or a touch pad region.

Referring to FIG. 4B, wiring regions that connect the active region 40 to a readout IC are tracer regions 42, 44, and 46. Unlike in FIG. 1 and FIG. 4B, the tracer regions 44 and 46 respectively may be formed on both sides of the sensing electrodes Rx: Rx1, Rx2, Rx3 . . . Rxn.

The first tracer region 11a connected to the sensing electrodes Rx: Rx1, Rx2, Rx3 . . . Rxn of the fingerprint sensor 100 of FIG. 1 or the fingerprint sensor 100a of FIG.

4A is formed on a side of the active region 10. However, the current example embodiment is not limited thereto, and the tracer regions 44 and 46 respectively may be formed on both sides of the sensing electrodes Rx: Rx1, Rx2, Rx3 . . . Rxn. Wirings of the extensions of the first sensing electrode Rx1 and the third sensing electrode Rx3 may be formed through the tracer region 44 on a right side of the active region 10, and wirings of the extensions of the second sensing electrode Rx1 and the $n_{th}$ sensing electrode Rxn may be formed through the tracer region 46 on a left side of the active region 10. Shield layers may also be formed on the tracer regions 42, 44, and 46. The shield layers may have a shape to cover the extensions of the driving electrodes Tx: Tx1, Tx2, Tx3, Tx4 . . . Txn and the sensing electrodes Rx: Rx1, Rx2, Rx3 . . . Rxn.

FIGS. 5A, 5B, 5C, and 5D are schematic cross-sectional views illustrating a method of manufacturing the fingerprint sensor 100 of FIG. 1, according to an example embodiment.

Figure 5A:
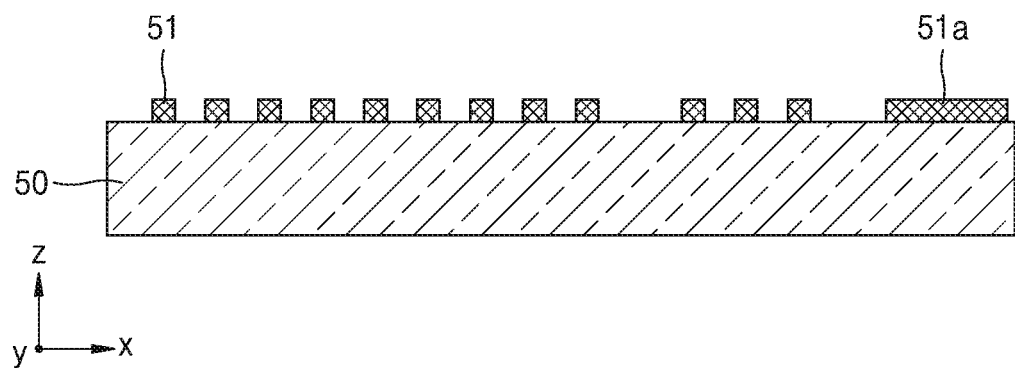
FIGS. 5A, 5B, 5C, and 5D are schematic cross-sectional views illustrating a method of manufacturing the fingerprint sensor of FIG. 1, according to an example embodiment.

Referring to FIG. 1 and FIG. 5A, a metal layer is formed on a substrate 50. Afterwards, the metal layer is patterned to form a metal pattern layer 51 for forming a pattern for forming via contacts that connect the driving electrodes Tx: Tx1, Tx2, Tx3, Tx4 . . . Txn and the sensing electrodes Rx: Rx1, Rx2, Rx3 . . . Rxn, and to form a pad 51a for contacting an external device, such as an external IC. Here, the driving electrodes Tx: Tx1, Tx2, Tx3, Tx4 . . . Txn may be formed including the extension. The driving electrodes Tx: Tx1, Tx2, Tx3, Tx4 . . . Txn may include a conductive material, such as a metal or a metal alloy, for example, Cu, Ag, Au, Pt, Al, W, Li, Ti, Ta, or Pd.

Figure 5B:
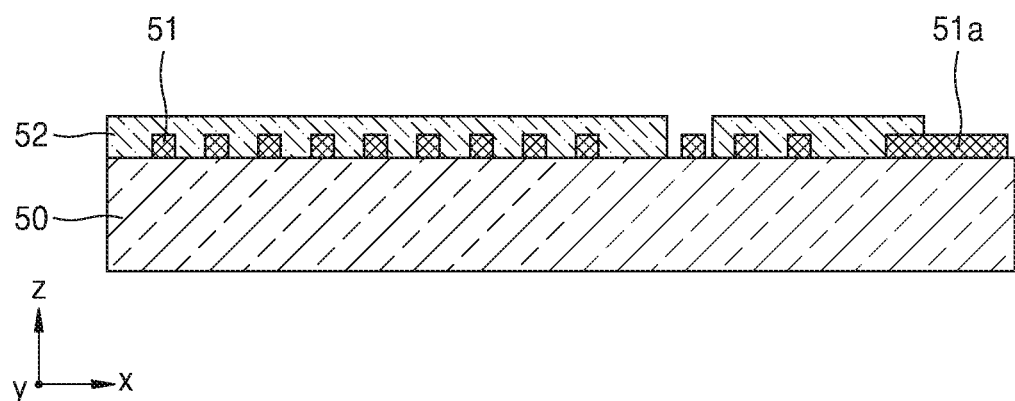

Referring to FIG. 1 and FIG. 5B, an insulating layer 52 is formed on the metal pattern layer 51 for forming a pattern for forming via contacts that connect the driving electrodes Tx: Tx1, Tx2, Tx3, Tx4 . . . Txn and the sensing electrodes Rx: Rx1, Rx2, Rx3 . . . Rxn, and on the pad 51a. A part of the metal pattern layer 51 may be exposed by etching a part of the insulating layer 52. The metal pattern layer 51 exposed by the insulating layer 52 may be via contact regions where edges of the sensing electrodes Rx: Rx1, Rx2, Rx3 . . . Rxn are connected when the sensing electrodes Rx: Rx1, Rx2, Rx3 . . . Rxn are formed in a subsequent process. The insulating layer 52 on the pad 51a may be removed. The insulating layer 52 may include an insulating material, for example, silicon oxide, a silicon insulating material, or an insulating material used in a general semiconductor process.

Figure 5C:
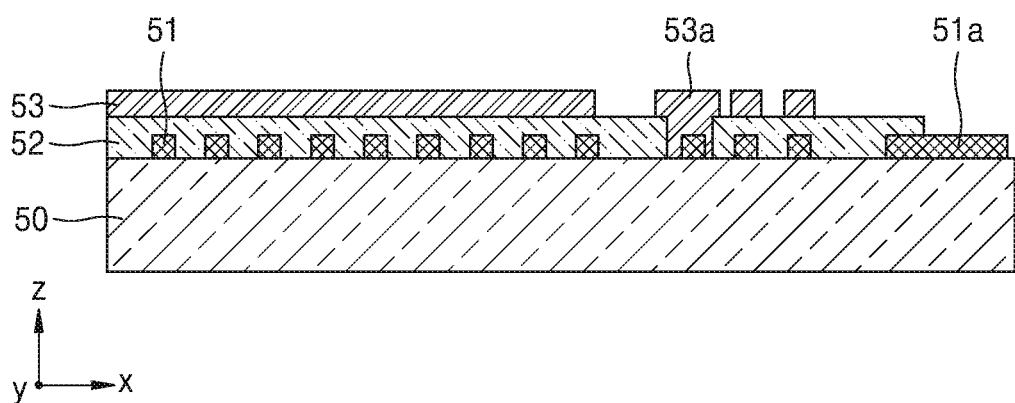

Referring to FIG. 1 and FIG. 5C, a transparent conductive oxide material is coated on the substrate 50, the exposed metal pattern layer 51, and the insulating layer 52. Afterwards, conductive oxide pattern layers 53 and 53a are formed by patterning the transparent conductive oxide material. The conductive oxide pattern layers 53 and 53a are formed to form the sensing electrodes Rx: Rx1, Rx2, Rx3 . . . Rxn. The conductive oxide pattern layer 53a that is directly connected to the metal pattern layer 51 may transmit a signal about fingerprint information of a user from the sensing electrodes Rx: Rx1, Rx2, Rx3 . . . Rxn by being connected to the sensing electrodes Rx: Rx1, Rx2, Rx3 . . . Rxn. Also, the conductive oxide pattern layer 53a may be used as a shield layer of a right-side region.

Figure 5D:
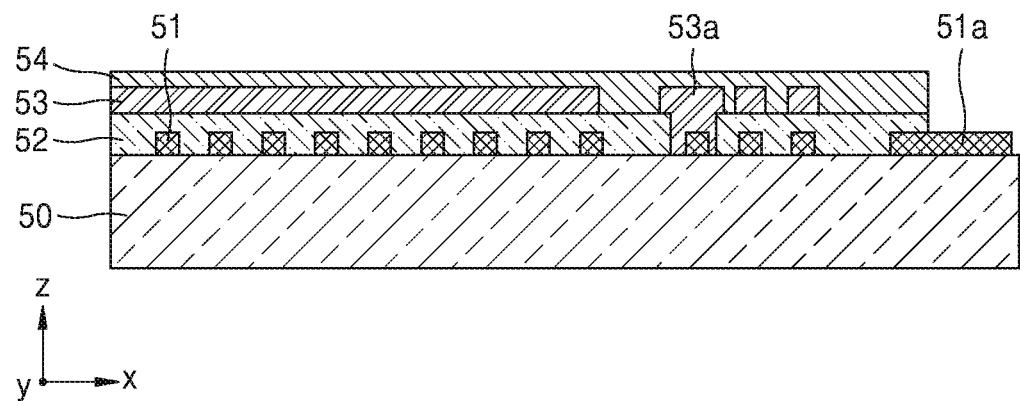

Referring to FIG. 1 and FIG. 5D, a passivation layer 54 is formed by coating an insulating material on the insulating layer 52 and the conductive oxide pattern layers 53 and 53a. Afterwards, the pad 51a is exposed by etching the passivation layer 54. The passivation layer 54 may include an insulating material, for example, silicon oxide, a silicon insulating material, or an insulating material used in a general semiconductor process.

Figure 6:
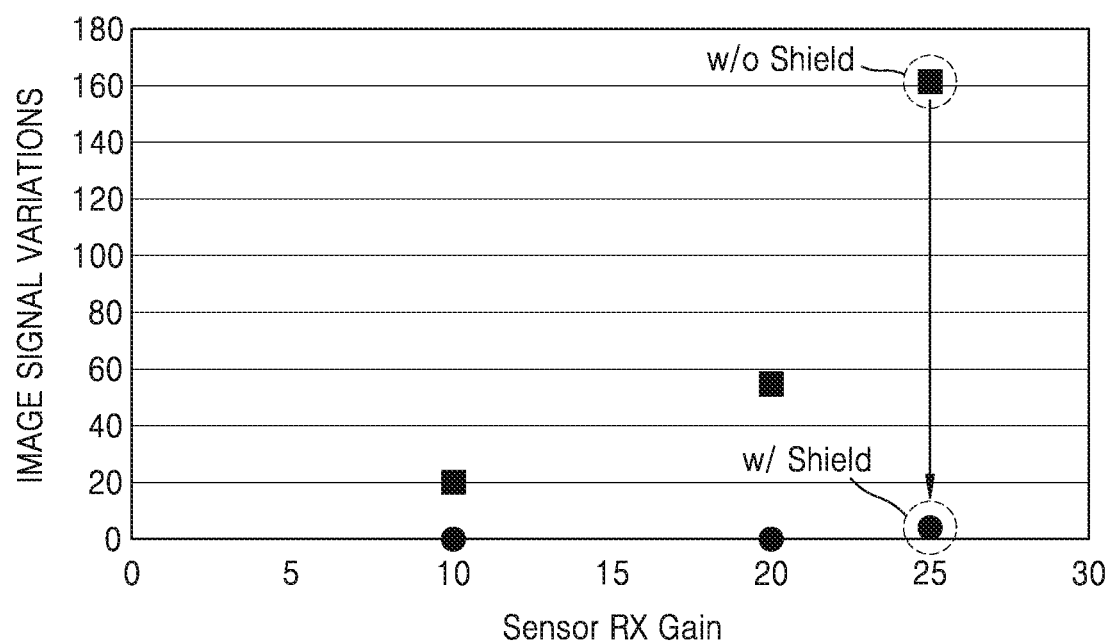
FIG. 6 is a graph showing amount of image signal variations with respect to Rx gains of the fingerprint sensor of FIG. 1, according to an example embodiment, and of a fingerprint sensor without a shield.

FIG. 6 is a graph showing an amount of image signal variations with respect to Rx gains of the fingerprint sensor 100 of FIG. 1, according to an example embodiment, and of a fingerprint sensor without a shield.

Referring to FIGS. 1 and 6, a case when the first and second shield layers 12 and 14 respectively are formed on the first and second tracer regions 11a and 11b (w/shield) is compared to a case when the first and second shield layers 12 and 14 are not formed on the first and second tracer regions 11a and 11b (w/o shield). In the case the first and second shield layers 12 and 14 are formed (w/shield), the amount of image signal variation of an Rx gain of a signal measured from the sensing electrode Rx when a fingerprint of a user contacts and does not contact the first and second tracer regions 11a and 11b is measured to be very small. In the case the first and second shield layers 12 and 14 are not formed (w/o shield), the amount of image signal variation of an Rx gain of a signal measured from the sensing electrode Rx when a fingerprint of a user contacts and does not contact the first and second tracer regions 11a and 11b is measured to be significantly higher than the case when the first and second shield layers 12 and 14 are formed (w/shield).

The result indicates that, when the first and second shield layers 12 and 14 respectively are formed on the first and second tracer regions 11a and 11b of the fingerprint sensor 100, the generation of noise is reduced, and thus, the degradation of a measured fingerprint image of a user is reduced.

A fingerprint sensor according to the current example embodiment may be applied to various mobile devices, such as tablet PCs, smart phones, and notebooks, and also, may be used in mobile devices by forming an active region on a region of a display of the mobile devices.

According to the current example embodiment, because shield layers are formed on an extension of a plurality of driving electrodes and an extension of sensing electrodes on tracer regions of a fingerprint sensor, although a fingerprint of a user touches the tracer regions, generation of noise is reduced, and thus, the degradation of a measured fingerprint image of the user is reduced.

While fingerprint sensors and a method of manufacturing the fingerprint sensors have been described with reference to the example embodiments thereof, it will be understood by those of ordinary skill in the art that various changes in form and details may be made therein without departing from the spirit and scope of the inventive concept as defined by the appended claims. The example embodiments may be considered in descriptive sense only and not for purposes of limitation. Therefore, the scope of the inventive concept is defined not by the detailed description of the inventive concept but by the appended claims, and all differences within the scope will be construed as being included in the inventive concept.

What is claimed is:

1. A fingerprint sensor comprising:
    an active region comprising driving electrodes and sensing electrodes crossing the driving electrodes;
    tracer regions connected respectively to the driving electrodes and the sensing electrodes; and
    shield layers disposed respectively on the tracer regions,
    wherein the sensing electrodes comprise a transparent conductive metal oxide and the driving electrodes comprise a metal material, and
    wherein the shield layers and a layer of the sensing electrodes are disposed at a same plane.

2. The fingerprint sensor of claim 1, wherein the tracer regions comprise:

a first tracer region comprising wirings connected respectively to the sensing electrodes as an extension of the sensing electrodes; and
a second tracer region comprising wirings connected respectively to the driving electrodes as an extension of the driving electrodes.

3. The fingerprint sensor of claim 2, wherein the shield layers comprise:
a first shield layer disposed on the extension of the sensing electrodes in the first tracer region; and
a second shield layer disposed on the extension of the driving electrodes in the second tracer region.

4. The fingerprint sensor of claim 1, wherein the shield layers comprise the transparent conductive metal oxide.

5. The fingerprint sensor of claim 1, wherein the sensing electrodes are connected to the metal material forming the driving electrodes through a via at an edge of the active region.

6. The fingerprint sensor of claim 1, wherein a shield layer connected to the sensing electrodes, among the shield layers, comprises a transparent conductive metal oxide, and
the sensing electrodes and the shield layer are spaced apart.

7. The fingerprint sensor of claim 1, wherein capacitances are disposed at regions where the driving electrodes cross the sensing electrodes.

8. The fingerprint sensor of claim 7, wherein a width of each of the sensing electrodes at a respective one of the regions at which the capacitances are disposed is less than a width of each of the sensing electrodes at a respective one of regions at which the capacitances are not disposed.

9. The fingerprint sensor of claim 1, wherein the shield layers have a diamond shape or a rectangular shape.

10. The fingerprint sensor of claim 1, wherein the sensing electrodes and the shield layers comprise the same transparent conductive metal oxide.

11. A fingerprint sensor comprising:
driving electrodes;
sensing electrodes crossing the driving electrodes;
first wiring extensions connected respectively to the sensing electrodes at a first side of the sensing electrodes;
second wiring extensions connected respectively to the driving electrodes;
third wiring extensions connected respectively to the sensing electrodes at a second side of the sensing electrodes, the second side being opposite to the first side;
a first shield layer disposed on the first wiring extensions;
a second shield layer disposed on the second wiring extensions; and
a third shield layer disposed on the third wiring extensions.

12. The fingerprint sensor of claim 11, wherein the driving electrodes and the second wiring extensions comprise a metal material, and
the sensing electrodes, the first wiring extensions, the first shield layer, the second shield layer, and the third shield layer comprise a transparent conductive metal oxide.

13. The fingerprint sensor of claim 1, wherein the sensing electrodes and the shield layers are formed in a same pattern including a plurality of polygonal shapes.

* * * * *